(12) United States Patent
Starodubov et al.

(10) Patent No.: US 6,442,305 B1
(45) Date of Patent: Aug. 27, 2002

(54) METHOD FOR ALTERING THE REFRACTIVE INDEX OF OPTICAL FIBERS USING STRESS

(75) Inventors: Dmitry Starodubov, Los Angeles; Ertan Salik, Culver City, both of CA (US)

(73) Assignee: Sabeus Photonics, Inc., Chatsworth, CA (US)

( * ) Notice: Subject to any disclaimer, the term of this patent is extended or adjusted under 35 U.S.C. 154(b) by 0 days.

(21) Appl. No.: 09/468,425

(22) Filed: Dec. 21, 1999

(51) Int. Cl.[7] .................................................. G02B 6/00
(52) U.S. Cl. ............................ 385/13; 385/10; 385/37; 385/124
(58) Field of Search ........................... 385/13, 10, 124, 385/37

(56) References Cited

U.S. PATENT DOCUMENTS

| | | | | |
|---|---|---|---|---|
| 4,474,427 A | * | 10/1984 | Hill | 385/123 |
| 5,384,884 A | | 1/1995 | Kashyap et al. | 385/129 |
| 5,613,023 A | * | 3/1997 | Guillon | 385/37 |
| 5,620,495 A | * | 4/1997 | Aspell | 385/124 |
| 5,787,213 A | * | 7/1998 | Brownlow | 385/37 |
| 5,953,478 A | * | 9/1999 | Sanghera | 385/123 |
| 5,956,442 A | * | 9/1999 | Byron | 385/37 |

OTHER PUBLICATIONS

Tsung–Ein Tsai, et al., "Tension effects on the growth kinetics of fiber Bragg gratings in photosensitive Ge–SiO2 fibers", OSA Technical Digest, Sep. 1999.*
T.Taunay, et al., "Bragg grating inscriptions within strained monomode high NA Ge doped fibres", J. Phys. D, 30(1997), pp. 40–52.*

P.Niay et al. "Bragg grating photoinscription within various types of fibers and glasses", OSA Technical Digest Series, vol.(22), Sep. 1995.*
I.Riant et al. "Study of the photosensitivity at 193nm and comparison with photosensitivity at 240nm, influence of fiber tension: type IIa aging", J. Ligh, Wave Tech. 15(8), Aug. 1997, pp. 1464–1469.*
Tsung–Ein Tsai, et al., Sep., 1999 Bragg Gratings, Photosensitivity, and Poling in Glass Waveguides, Conference Edition, Tension Effects on the Growth Kinetics of Fiber Bragg Gratings in Photosensitive Ge–SiO2 Fibers, FD4–1–4/205,206,207,208.
T. Taunay, et al., 1997 J. Phys. D: Appl. Phys. "Bragg grating Inscriptions within strained monomode high NA Germania–doped fibres: part I. Experimentation", 30 40–52, printed in the UK.
P. Niay, et al., Sep. 1995 Photosensitivity and Quadratic Nonlinearity in Glass Waveguides—Fundamentals and Applications, 1995 Technical Digest Series vol. 22, "Bragg Grating Photoinscription Within Various Types of Fibers and Glasses".
Riant, et al., Aug. 1997 Journal of Lightwave Technology, vol 15, No. 8, "Study of the Photosensitivity at 193 nm and Comparison with Photosensitivity at 240 nm Influence of Fiber Tension: Type IIa Aging", 1464–1469.

* cited by examiner

Primary Examiner—Cassandra Spyrou
Assistant Examiner—Leo Boutsikaris
(74) Attorney, Agent, or Firm—Fulwider Patton Lee & Utecht, LLP

(57) ABSTRACT

An optical fiber is stressed along its axis with a strain of at least 1% while light is introduced transversely to write a grating. The strain increases the photosensitivity of the fiber and reduces the time required to write the grating. Alternatively, the fiber can be compressed radially and inwardly, or compressed along its axis.

46 Claims, 3 Drawing Sheets

METHOD FOR ALTERING THE REFRACTIVE INDEX OF OPTICAL FIBERS USING STRESS

STATEMENT OF GOVERNMENT RIGHTS

This invention was funded at least in part by the Department of Defense under Grant No. F49620-97-1-0238. The government may have certain rights in this invention.

BACKGROUND

1. Field of Invention

This invention relates to optical fibers and waveguides, specifically to writing gratings in fibers and waveguides.

2. Prior Art

Optical fibers are now widely used for carrying light signals in optical communication systems. Alterations in the refractive index in the fibers (known as "gratings") are used to control those light signals. Fiber gratings can serve as filters, routers, modulators, and attenuators, can be used to process different channels in a wavelength-division multiplexed (WDM) telecommunication system, or can be used to control the output of lasers.

Several methods have been proposed for fabricating fiber gratings. A fiber can be illuminated from the side with a periodic pattern of ultraviolet light, causing a permanent change in the refractive index of the fiber's photosensitive core. The resulting periodic index pattern forms the fiber grating.

The time required to write a grating depends on the photosensitivity of the fiber's glass core. Photosensitivity is essentially the inverse of how much laser fluence is needed to obtain fixed grating strength. For fibers with high concentration (>10% mol.) of germanium in their core, photosensitivity is high and the time required to write a grating is minimized. However for some applications the numerical aperture of such fibers can be undesirably high (numerical aperture, NA>0.2). For standard communication fibers (NA~0.12) having less than 3% mol. germanium in the core, the photosensitivity of the core is small. Writing a grating in such fibers requires a considerable fluence of ultraviolet light, thus increasing the time to write the grating. For Bragg gratings, the period of the grating is typically ~0.5 micron, so even very slight movements or drift in the position of the fiber during writing can ruin the grating.

It is known that immersing an optical fiber in an atmosphere of high-pressure hydrogen for many hours can increase the photosensitivity of the fiber, but this is a tedious and possible dangerous procedure. Alternatively, the fiber can be doped with a high concentration of Ge in the core and then co-doped with boron to reduce the NA of the fiber. Such fibers have an increased photosensitivity, but the addition of boron to the core makes the resulting grating less stable, meaning that it erases more quickly over time. One can also decrease the wavelength of the UV light below 200 nm, where the sensitivity of fiber increases, however such short-wavelength laser sources are difficult to operate. Exotic and expensive materials must be used for the optical elements that transmit laser light at such short wavelengths. The most common source for such laser light is the argon/fluorine excimer laser, whose fluorine gas is exceedingly reactive and poisonous.

SUMMARY OF THE INVENTION

The present invention includes a method and a means for stretching an optical fiber while illuminating the fiber, either transversely or by sending light through the fiber, in order to write a grating. The stretching is done in such a way that it increases photosensitivity and reduces time for writing a grating.

The fiber can be stretched by first wrapping a few turns of the fiber around a suitable mandrel, or the fiber can be damped. A separation between two portions of the fiber is increased until a desired strain (i.e., $\Delta l/l$) is obtained. Alternatively, the fiber can be compacted by applying an inwardly directed radial force to the fiber. Alternatively, the fiber can be compacted by applying a compressive force along the axis of the fiber.

The grating can be formed in the core of the fiber or in the cladding of the fiber, depending on the composition of the fiber and how the incident light is focused onto the fiber. The light can be ultraviolet, visible light, or infrared.

The glass fiber can be stripped of all or a desired portion of a plastic coating formed around the cladding before the fiber is stretched and illuminated. Alternatively, the fiber can be stretched and illuminated with its plastic coating intact. In the latter case, the wavelength of the light must pass through the fiber coating with minimal loss, as described in U.S. Pat. No. 5,881,186. For some plastic coatings, it would be difficult to write a reasonably strong grating (R>1%) through the coating of such unstretched fibers because the optical fluence required to do so would destroy the coating. Alternatively, the fiber may have a thin layer of metal coating the fiber cladding.

By stretching the fiber, the optical fluence needed to write a grating (the inverse of photosensitivity) is greatly reduced (e.g., by a factor of 20), so that the time that the fiber must be exposed to light is reduced by the same factor. By stretching the fiber, a grating can be written through the plastic coating of commercially available conventional fibers without damaging the fiber coating. Therefore this method enables gratings to be written by directing light transversely through the fiber coating in some fibers, where without the stretching the fiber coating would be destroyed before the grating could be written. The fiber core can also be illuminated by shining light along the axis of the fiber while the fiber is under stress.

As described in the preferred embodiments, the present invention thus includes a method for faster writing of gratings in optical fibers having small concentrations of Ge in their core; an efficient method for writing gratings in optical fibers without a fluorine-based excimer laser; a method for writing gratings in optical fibers without hydrogen loading the fibers; a method for writing gratings in optical fibers without compromising the long-term stability of the resulting grating; a method for writing gratings in optical fibers that enables one to write through a polymer coating of the fiber without damaging the coating; and a method for writing gratings in optical fibers that is simple and easy to implement, thereby increasing the speed and decreasing the cost of grating manufacture.

Other features and advantages will become apparent from the following description, drawings, and claims.

DESCRIPTION OF PREFERRED EMBODIMENTS

The inventors have found that the photosensitivity of an optical fiber can be increased significantly if the fiber is stretched and, while under stress, illuminated with light, such as UV light. The stretching is preferably performed so that it produces a strain (i.e., $\Delta l/l$) of at least 1%, and beneficial effects have been found at 2% and up to at least 3.3%. While not wanting to be limited to a particular theory, it is believed that stretching the fiber longitudinally (along its length) exerts a transverse (i.e., radial) compacting force, and that this force compacts the fiber more effectively where it is illuminated with UV light. When the light is removed, the compaction persists. By illuminating the fiber from the side with a pattern of UV light while the fiber is under stress, a pattern of compaction is created in the fiber. Regions that are more compact have a higher index of refraction. The resulting pattern of refractive index forms the fiber grating.

This discovery is contrary to a number of articles that assert that it is undesirable to strain a fiber when writing a grating. See e.g., T. Taunay et al., J Phys. D: Appl. Phys. 30, 40–52 (1997), and I. Riant and F. Haller, J. Lightwave Tech., Vol. 15, no. 8, 1464–69 (1997). In these cases, the strain was no more than about 0.67%. U.S. Pat. No. 5,787,213 does suggest applying a strain of 6% or more, but in this case the fiber is bent in a loop, so that while the outer surface of the fiber loop is strained the inside surface of the loop is actually compressed. This means that in the region of the fiber core the strain is approximately zero. Consequently, the suggested bending method is much different from imposing a longitudinal strain on the fiber core, and tests have confirmed that this bending technique does not substantially enhance the fiber's photosensitivity. Furthermore, it is believed that a longitudinal strain of over about 6% would break a typical optical fiber. U.S. Pat. No. 5,956,442 also shows straining a fiber to write a grating, but only by 0.6% initially, and then reduced in fifteen successive 0.04% steps to produce a chirped grating.

Figure 1A:
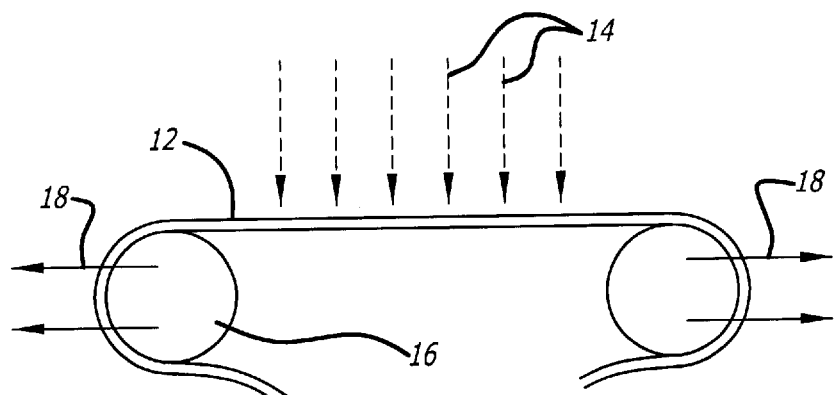
FIGS. 1a, 1b and 1c show methods of straining a fiber while illumrinating the fiber with light.

An embodiment of the present invention is shown in FIG. 1a. Optical fiber 12 is wrapped around mandrels 16 and stretched in the direction of arrows 18, (i.e., longitudinally or along the axis of the fiber). Light 14 illuminates the fiber transversely to the longitudinal direction so as to alter the refractive index of the fiber.

Light can be provided transversely in multiple beams that combine in the core or cladding, or light can be provided through a mask between the fiber and a light source as described in U.S. Pat. No. 5,881,186, which is incorporated by reference for all purposes. As described in that patent, there are benefits to using light having a wavelength of at least near UV, i.e., at least 275 nm, such as the use of a polymer or plastic phase mask for providing light to the fiber. Alternatively, light can be provided along the longitudinal axis, as shown for example in U.S. Pat. No. 5,384,884, and as illustrated in FIG. 1c. In FIG. 1c, light 14 is directed into one end of fiber 12, illuminating the fiber along its longitudinal axis to form a grating in the fiber while the fiber is strained between mandrels 16.

Figure 1B:
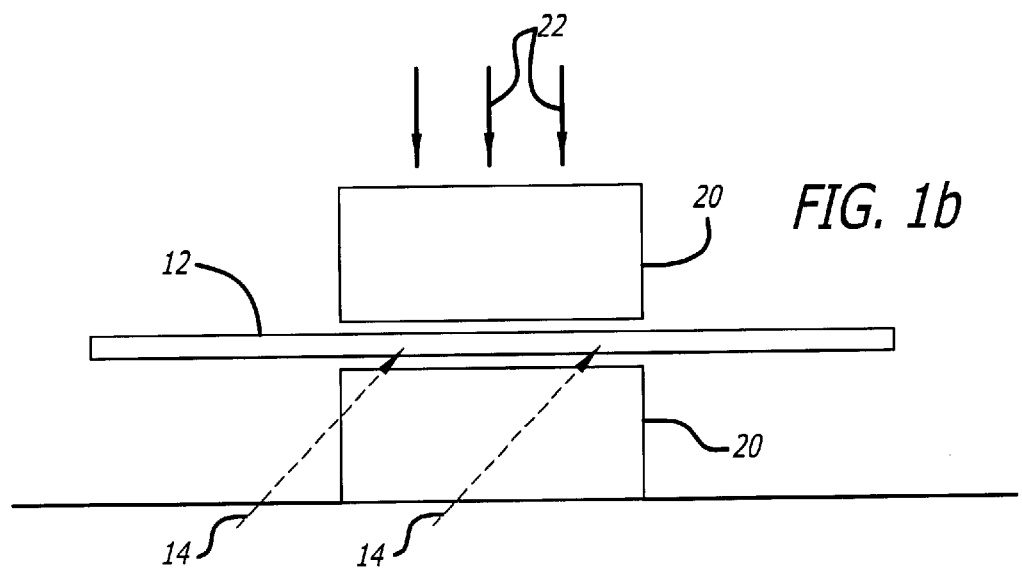
Figure 1C:
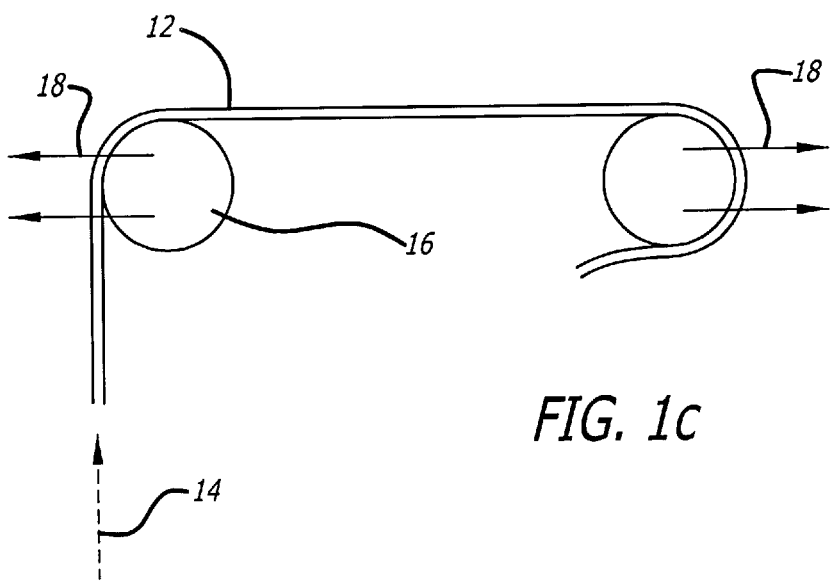

FIG. 1b shows an assembly for compressing a fiber 12 inwardly and radially between two blocks 20 with a compressive force 22 while the compressed portion of fiber 12 is illuminated transversely with light 14. While the mechanism here is different from that for longitudinal strain and the effects are different in some respects, it is believed that such compression similarly increases photosensitivity of the fiber when illuminated. Light could be provided along the longitudinal axis in this embodiment as well.

Figure 2:
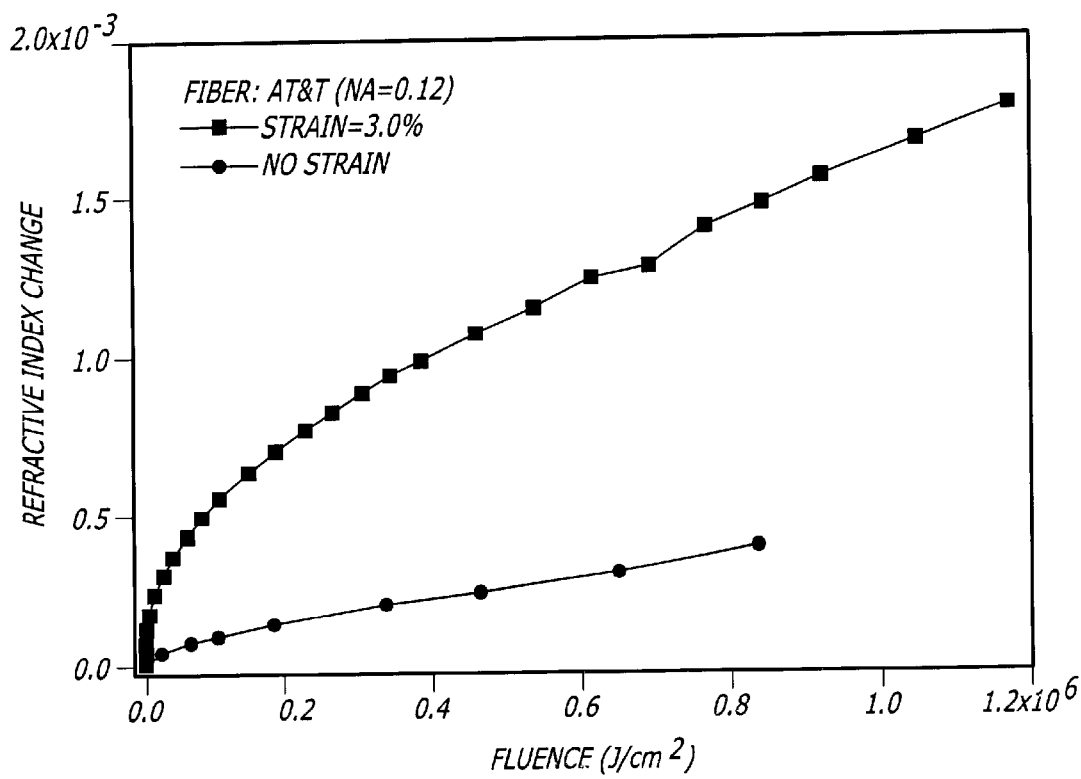
FIG. 2 is a graph showing the enhancement in the photosensitivity that occurs when a fiber is stretched while illuminated by light.

FIG. 2 is a graph that shows a comparison of the change in the index of refraction caused by UV light in standard telecommunications fiber. In the longitudinally strained fiber with a strain of 3%, the index change grows quickly with laser fluence. In contrast, in the unstrained fiber, the index changes more slowly and reaches a smaller plateau.

Figure 3:
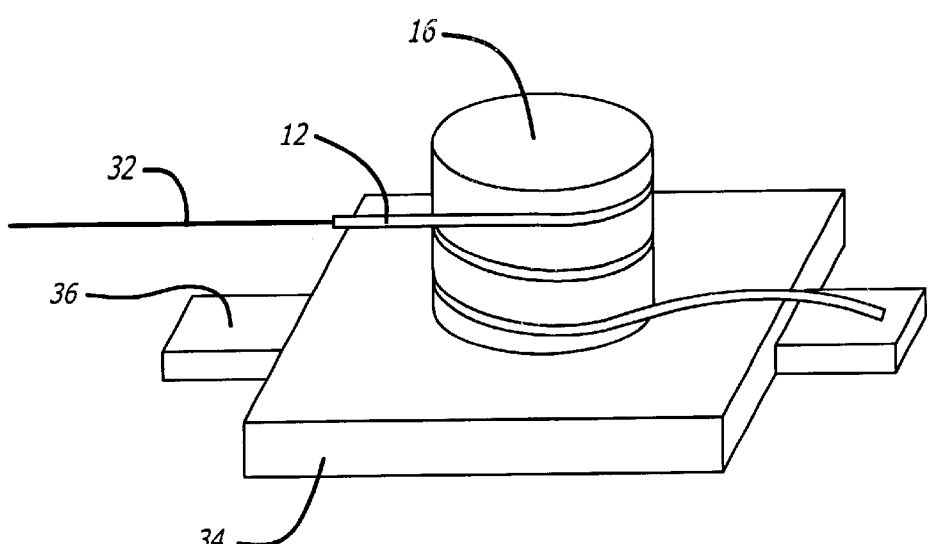
FIG. 3 shows a fiber wrapped around a sliding mandrel to stretch the fiber.

FIG. 3 shows a mechanism for holding and applying strain to a fiber. Optical fiber 12, with its protective plastic coating, is wrapped around a mandrel 16. The protective coating may be partially removed, or fully removed, to expose fiber 32 away from the mandrel. Mandrel 16 is attached to a base 34, which can slide along a track 36. A screw (not shown) pushes on base 34 to exert tension on fiber 12, which is affixed at its far end. The system can be computer controlled as described in V. Grubsky et al., Phot. Tech. Lett 11, 87–89 (1999), which is incorporated herein by reference. When the strain is applied, fiber 32 can be illuminated from the side to write the grating.

Figure 4:
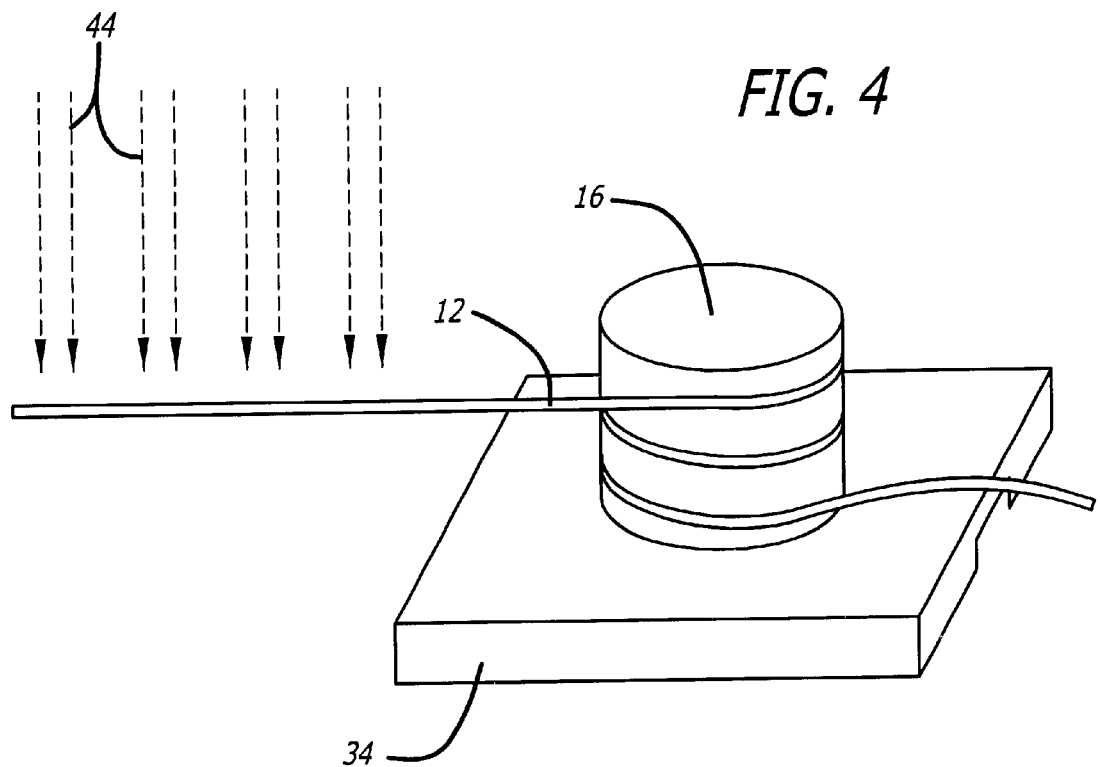
FIG. 4 shows the illumination of a stretched fiber without removing the fiber coating.

FIG. 4 shows a fiber 12 with its protective coating in place and illuminated by a pattern of ultraviolet light 44 to create a similar refractive index pattern in the fiber. Fiber 12 is wound around a mandrel 16 and stretched in a manner similar to that shown in FIG. 3.

Figure 5:
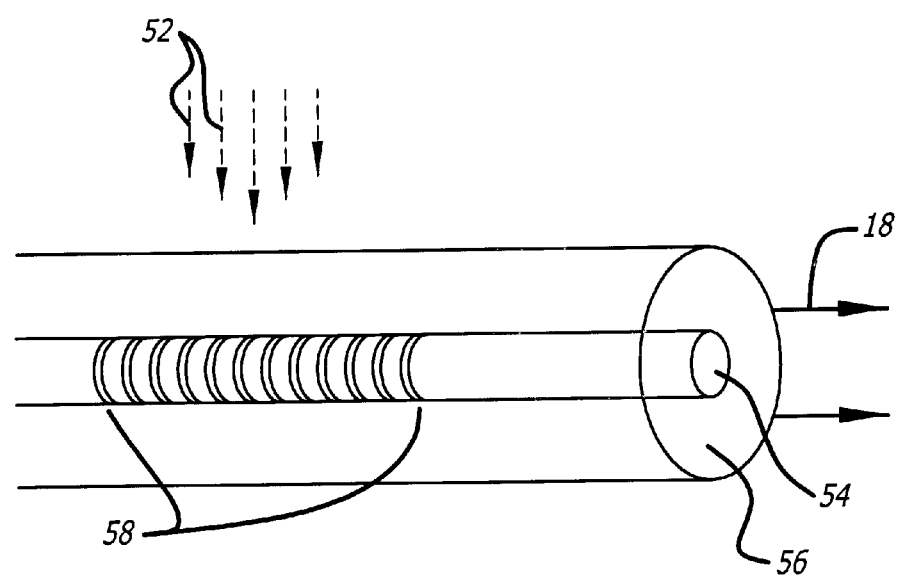
FIG. 5 shows the illumination of an existing grating in a stretched fiber with an apodizing pattern of light.

FIG. 5 shows an optical fiber with a core 54 and a cladding 56 illuminated from the side by a pattern of UV light 52. The fiber has a grating 58 already written into its core. UV light 52 alters the envelope of the grating. The illumination occurs while the fiber is under stress, as indicated by the arrows 18.

Based on tests that have been performed, it is believed that small amounts of strain can provide a slight increase in photosensitivity (contrary to some of the above-cited articles), but that at about 1% strain, the benefit improves more significantly and continues to improve above 2%, and up to at least 3.3%. In one test, it was found that the photosensitivity doubled at about 1.5% strain and had a fourfold to fivefold improvement in photosensitivity at about 3% strain.

Gratings previously formed in an optical fiber can be permanently tuned by this technique. The grating is illuminated by a uniform light pattern while the fiber is under stress. The average refractive index of the fiber will then be altered, thereby altering the resonance wavelength of the grating. For example, for a Bragg grating the resonance wavelength $\lambda_B$ is given by $$\lambda_B = 2nd$$

where d is the period of the grating (d<10 microns for a Bragg grating) and n is the average index of refraction. Altering the average index of refraction thereby alters the resonance wavelength of the grating. With this method the resonance wavelength of a grating can be tuned without having to strip the fiber coating down to the bare glass. By avoiding stripping, the mechanical strength of the fiber is preserved.

Gratings previously formed in an optical fiber can be apodized or chirped by this technique. Illuminating the stretched fiber grating transversely with the appropriate light pattern can create chirp on the grating. For example, by using a pattern of light that increases monotonically in intensity, the grating can have a monotonically increasing chirp imposed upon it. Stretching could be changed during exposure, for example, for grating apodization.

Gratings with long periods (d=10 microns–1000 microns) can also be written in stretched fibers. Such long-period gratings can be used to couple light into cladding modes of the fiber, or between co-propagating core modes in multi-mode fibers. Stretching the fiber reduces the fluence of light needed to form the grating, and thereby reduces the time required to write the grating.

Water vapor weakens glass. Therefore, the fiber can be exposed to light in an atmosphere having a reduced amount of water vapor in order to prevent the fiber from breaking at high strains. Heating the fiber drives water away from the glass. Therefore, the fiber can be heated to further protect the fiber from breaking. For example the fiber can be heated above 100 degrees C. Cooling the fiber can also reduce the effectiveness with which water weakens glass. For example the fiber can be cooled with liquid nitrogen.

Metal coated fibers can have increased tensile strength compared to uncoated fibers. Therefore, to increase the maximum strain that can be applied to the fiber, the fiber may contain a thin layer of metal coating over the fiber cladding. A metal coated fiber would also have the additional advantage here that it can be easily gripped by rapid soldering so that strain can then be applied to the fiber.

EXAMPLE 1

A Bragg grating is fabricated in an optical fiber of NA=0.31 having a Ge-doped core (e.g., a fiber known as Fibercore SM1500HG). The writing beam is 50 mW of 244-nm UV light from a frequency-doubled Ar laser and is focused onto the fiber by a cylindrical lens with 3-cm focal length. To write the grating, the writing beam is scanned along the fiber length through a transparent phase mask for a distance of 5 mm at a speed of 20 $\mu$m/s. With no strain in the fiber the resulting Bragg grating reflection is only 5 dB deep. However, with 2.5% of strain in the fiber the grating reflection is 15 dB deep.

EXAMPLE 2

A long-period grating is fabricated in a standard telecommunication fiber manufactured by AT&T. The UV light from a frequency-doubled Ar laser at $\lambda$=244 nm is focused on the fiber core by a 10× microscope objective. A strain of 3% is applied to the fiber during exposure. The grating has 80 identical 320-$\mu$m periods. With 50 mW of incident laser power, a 10-dB grating is formed. (When no strain is applied, the grating strength was only 1 dB.)

EXAMPLE 3

A Bragg grating is fabricated in a fiber having 20 mol. % of Ge in the core. The UV source is 100 mW of 334-nm light from Ar laser. With a cylindrical lens the UV light is focused through a plastic phase mask and right through the fiber's polymer coating onto the fiber's core. A strain of 2% is applied to the fiber during writing. A 6-mm long Bragg grating with 20% reflection appears after 30 seconds.

Similar effects to those mentioned in the examples above were found on the fiber in Example 1 when 334 nm light from an Ar laser was used, and also in a GeO$_2$-B$_2$O$_3$ doped core fiber (Fibercore PS 1500, NA=0.14).

Other embodiments are within the scope of the following claims.

What is claimed is:

1. A method of forming a refractive index pattern in an optical fiber by illuminating the fiber with light while the fiber is strained along its longitudinal axis by a sufficient amount to increase the photosensitivity of the fiber by at least a factor of 2.

2. The method of claim 1, wherein the fiber is illuminated at a portion where there is no coating around the fiber.

3. The method of claim 1, wherein the fiber is illuminated at a portion where there is a coating around the fiber.

4. The method of claim 1, wherein the light is introduced transverse to a longitudinal direction of the fiber.

5. The method of claim 1, wherein the light is introduced along a longitudinal direction of the fiber.

6. A method of forming a refractive index pattern in an optical fiber by illuminating the fiber with light while the fiber is compressed inwardly and radially.

7. The method of claim 6, wherein the light is introduced transverse to a longitudinal direction of the fiber.

8. The method of claim 6, wherein the light is introduced along a longitudinal direction of the fiber.

9. The method of claim 1, wherein the light is applied from the side of the fiber transverse to the longitudinal axis.

10. The method of claim 1, wherein the light is transmitted through the fiber along the longitudinal axis.

11. The method of claim 1, wherein the pattern is formed by a mask.

12. The method of claim 11, wherein the pattern is formed by a plastic phase mask.

13. The method of claim 1, where the fiber is stretched in an environment having humidity <30%.

14. The method of claim 1, where the fiber is stretched in a liquid.

15. The method of claim 1, where the fiber is stretched in an environment having a temperature greater than 100° C.

16. The method of claim 1, where the fiber is cooled during illumination with liquid nitrogen while illuminating.

17. The method of claim 16, wherein the cooling is performed by using liquid nitrogen.

18. The method of claim 1, wherein the pattern has alternating bright and dark regions with period of more than 10 microns to produce a long period grating.

19. The method of claim 1, further comprising removing a coating from the fiber before illuminating, and illuminating a portion of the fiber with the coating removed.

20. The method of claim 1, wherein the fiber has its coating intact and the coating is not removed.

21. The method of claim 1, wherein the fiber has its coating partially removed.

22. The method of claim 11, wherein the fiber has a metal coating.

23. The method of claim 1, wherein the straining is performed so that the strain of the fiber is greater than 2%.

24. The method of claim 1, wherein the straining is performed so that the strain of the fiber is greater than 3%.

25. The method of claim 1, wherein the pattern has alternating bright and dark regions with period of less than 10 microns to produce a Bragg grating.

26. A method of forming a refractive index in a fiber having a core comprising straining the fiber in a selected environment having a humidity of <30% along its longitudinal axis to impose a strain of at least 1%, and while straining, illuminating the fiber with light to form a refractive-index pattern.

27. The method of claim 26, wherein the selected environment is a liquid.

28. The method of claim 26, wherein the selected environment has a temperature greater than 100° C.

29. The method of claim 26, wherein the fiber is cooled with liquid nitrogen while illuminating the fiber with light to form the refractive-index pattern.

30. The method of claim 26, wherein the light is applied from the side of the fiber transverse to the longitudinal axis.

31. The method of claim 30, wherein the light is UV light.

32. The method of claim 26, wherein illuminating the fiber includes transmitting light through the fiber along the longitudinal axis.

33. The method of claim 32, wherein the light has a wavelength of at least 275 nm.

34. The method of claim 30, wherein the pattern is formed by a mask.

35. The method of claim 34, wherein the pattern is formed by a plastic phase mask.

36. The method of claim 30, wherein the pattern is formed by optical interference.

37. The method of claim 26, wherein the pattern has alternating bright and dark regions with period of less than 10 microns to produce a Bragg grating.

38. The method of claim 26, wherein the pattern has alternating bright and dark regions with period of more than 10 microns to produce a long period grating.

39. The method of claim 26, further comprising removing a coating from the fiber before illuminating, and illuminating a portion of the fiber with the coating removed.

40. The method of claim 26, wherein the fiber has its coating intact and the coating is not removed.

41. The method of claim 26, wherein the fiber has its coating partially removed.

42. The method of claim 26, wherein the fiber has a metal coating.

43. The method of claim 39, wherein the fiber has a metal coating.

44. The method of claim 26, wherein the fiber is hydrogen loaded.

45. The method of claim 26, wherein the straining is performed so that the strain of the fiber is greater than 2%.

46. The method of claim 26, wherein the straining is performed so that the strain of the fiber is greater than 3%.

* * * * *

UNITED STATES PATENT AND TRADEMARK OFFICE
CERTIFICATE OF CORRECTION

PATENT NO. : 6,442,305 B1
DATED : August 27, 2002
INVENTOR(S) : Dmitry Starodubov et al.

It is certified that error appears in the above-identified patent and that said Letters Patent is hereby corrected as shown below:

Column 3,
Line 52, delete "c1adding" and insert -- cladding --.

Column 6,
Line 46, delete "claim 11" and insert -- claim 1 --.

Signed and Sealed this

Ninth Day of August, 2005

JON W. DUDAS
*Director of the United States Patent and Trademark Office*